(12) United States Patent
Lee

(10) Patent No.: US 11,471,971 B2
(45) Date of Patent: Oct. 18, 2022

(54) MULTI POINT PROJECTION WELDING METHOD AND LOADING-WELDING SYSTEM FOR CAR-BODY ASSEMBLY USING THE SAME

(71) Applicants: HYUNDAI MOTOR COMPANY, Seoul (KR); KIA MOTORS CORPORATION, Seoul (KR)

(72) Inventor: Hyun Woo Lee, Ulsan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 206 days.

(21) Appl. No.: 16/594,635

(22) Filed: Oct. 7, 2019

(65) Prior Publication Data

US 2020/0038987 A1 Feb. 6, 2020

Related U.S. Application Data

(62) Division of application No. 14/829,571, filed on Aug. 18, 2015, now Pat. No. 10,471,534.

(30) Foreign Application Priority Data

Dec. 22, 2014 (KR) .......................... 10-2014-0185837

(51) Int. Cl.
*B23K 11/11* (2006.01)
*B23K 11/30* (2006.01)
(Continued)

(52) U.S. Cl.
CPC .............. *B23K 11/11* (2013.01); *B23K 11/14* (2013.01); *B23K 11/3009* (2013.01);
(Continued)

(58) Field of Classification Search
CPC ... B23K 11/11; B23K 11/3009; B23K 11/312; B23K 11/314; B23K 2101/18;
(Continued)

(56) References Cited

U.S. PATENT DOCUMENTS 3,415,973 A * 12/1968 Verbeck ............... B23K 11/312
219/118
4,069,924 A 1/1978 McCorkle
(Continued)

FOREIGN PATENT DOCUMENTS

| JP | H06-009832 U | 2/1994 |
| JP | H08-132249 A | 5/1996 |

(Continued)

OTHER PUBLICATIONS

Notice of Allowance issued in related U.S. Appl. No. 14/829,571 dated Jul. 8, 2019.

(Continued)

*Primary Examiner* — Chris Q Liu
(74) *Attorney, Agent, or Firm* — Morgan, Lewis & Bockius LLP

(57) ABSTRACT

A component loading-welding system for welding a component panel to a vehicle body panel includes a rotation portion body having first and second opposing sides. The first opposing side is coupled to a robot arm. A picking device is installed in the rotation portion body and is configured to hold and release the component panel. A vehicle body pressurizing tip is installed in the rotation portion body. A pressurizing portion body is rotatably installed at the second opposing side of the rotation portion body. A pin clamp is installed in the pressurizing portion body and is configured to clamp the component panel. A component pressurizing tip is installed in the pressurizing portion body and is configured to apply pressure to the
(Continued)

component panel. A multi point projection welding method is also disclosed.

3 Claims, 10 Drawing Sheets

(51) Int. Cl.
| | |
|---|---|
| *B23K 11/31* | (2006.01) |
| *B23K 11/14* | (2006.01) |
| *B23K 101/18* | (2006.01) |
| *B23K 37/04* | (2006.01) |
| *B23K 101/00* | (2006.01) |

(52) U.S. Cl.
CPC ........ *B23K 11/314* (2013.01); *B23K 37/0435* (2013.01); *B23K 2101/006* (2018.08); *B23K 2101/18* (2018.08)

(58) Field of Classification Search
CPC ....... B23K 11/15; B23K 11/14; B23K 11/115; B23K 2101/006; B23K 2103/04; B23K 37/0435; B23K 26/244; B23K 37/0443; B23K 11/20; B23K 11/315; B23K 11/36; B23K 11/002; B23K 11/255; B23K 11/31; B23K 2101/34; B23K 2103/08; B23K 2103/10; B23K 2103/50; B23K 26/22; B23K 26/32; B23K 31/02; B23K 33/00; B23K 10/00; B23K 10/02; B23K 11/0026; B23K 11/0053; B23K 11/06; B23K 11/093; B23K 11/16; B23K 11/22; B23K 11/24; B23K 11/253; B23K 11/257; B23K 11/3081; B23K 11/318; B23K 11/364; B23K 2101/36; B23K 2101/42; B23K 2103/20; B23K 26/211; B23K 26/242; B23K 26/26; B23K 26/28; B23K 33/008; B23K 35/0205; B23K 35/0255; B23K 35/0261; B23K 37/0408; B23K 37/047; B23K 9/0026; B23K 9/23; Y10S 901/42
USPC ......... 219/119, 78.01, 117.1, 765, 777, 86.9, 219/86.22, 87, 91.2, 93, 118, 121.64, 219/86.1, 94, 108, 110, 125.1, 56.22, 219/59.1, 78.02, 78.13, 78.16, 86.21, 219/86.24, 86.33, 91.1, 91.21, 91.23, 92
See application file for complete search history.

(56) References Cited

U.S. PATENT DOCUMENTS

| | | | | |
|---|---|---|---|---|
| 4,427,869 | A | * | 1/1984 | Kimura .................. B23K 11/14 219/93 |
| 4,447,752 | A | | 5/1984 | Boyce et al. |
| 5,783,794 | A | * | 7/1998 | Oikawa ................. B23K 11/115 219/94 |
| 6,373,021 | B1 | * | 4/2002 | Wang ..................... B23K 11/14 219/94 |
| 6,420,671 | B1 | | 7/2002 | Tsujimoto et al. |
| 6,806,436 | B2 | * | 10/2004 | Katou .................... B23K 11/11 219/86.9 |
| 8,157,155 | B2 | | 4/2012 | Diez et al. |
| 9,486,875 | B2 | * | 11/2016 | Hasegawa .............. B23K 11/11 |
| 2002/0166843 | A1 | * | 11/2002 | Wang ................... B23K 11/115 219/78.16 |
| 2005/0269756 | A1 | * | 12/2005 | Stevenson ............. B23Q 1/035 269/266 |
| 2009/0249606 | A1 | | 10/2009 | Diez et al. |
| 2010/0036525 | A1 | | 2/2010 | Casanelles et al. |
| 2012/0067851 | A1 | | 3/2012 | Lee |
| 2012/0145677 | A1 | * | 6/2012 | Shirai ................... B23K 11/14 219/108 |

FOREIGN PATENT DOCUMENTS

| | | |
|---|---|---|
| JP | 2509349 Y2 | 9/1996 |
| JP | H11-333569 A | 12/1999 |
| JP | 2003-251469 A | 9/2003 |
| JP | 2009-279597 A | 12/2009 |
| JP | 2013-188783 A | 9/2013 |
| KR | 10-0494902 B1 | 6/2005 |
| KR | 10-2009-0091240 A | 8/2009 |
| KR | 10-0949453 B1 | 3/2010 |

OTHER PUBLICATIONS

Non-Final Office Action issued in related U.S. Appl. No. 14/829,571 dated Dec. 28, 2018.
Final Office Action issued in related U.S. Appl. No. 14/829,571 dated Jun. 27, 2018.
Non-Final Office Action issued in related U.S. Appl. No. 14/829,571 dated Oct. 20, 2017.

* cited by examiner ent inventive concept, a component loading-welding system

MULTI POINT PROJECTION WELDING METHOD AND LOADING-WELDING SYSTEM FOR CAR-BODY ASSEMBLY USING THE SAME

CROSS-REFERENCE TO RELATED APPLICATION

This application is the Divisional Application of U.S. patent application Ser. No. 14/829,571 filed on Aug. 18, 2015, which claims the benefit of priority to Korean Patent Application No. 10-2014-0185837 filed on Dec. 22, 2014 in the Korean Intellectual Property Office, the disclosures of which are incorporated herein in their entirety by reference.

TECHNICAL FIELD

The present disclosure relates to an apparatus for loading and welding a vehicle body component, and more particularly, to a loading-welding system for a car body assembly so as to perform loading and welding components of a vehicle body in one apparatus using a multi point projection welding method.

BACKGROUND

Most processes of loading and bonding (welding) a component panel on a vehicle body panel on an automobile production line are automated.

Typically, such automation equipment includes an alignment jig for aligning a home position of a component prior to supply of a component, a gripper for gripping the aligned component, an installation home positioning jig for aligning and pressurizing the component gripped by the gripper at a home position of a vehicle body, and a welding apparatus for performing spot welding in order to fix a component to an attachment position of the vehicle body, which are separately positioned. That is, typically, in order to install a component on the vehicle body, separate multi-step apparatuses are installed and managed for continuous processes on a production line.

However, this typical production line structure is completed by combining components on a sub line and is basically used in a method of assembling complete units in a main buck. However, in this method, a floor, a side, and a roof are coupled in complete units to a vehicle body, and thus it is necessary to weld closed sections. In addition, in this method, components are positioned based on a pre-set assembly jig, and thus it is necessary to prepare a pre-set assembly jig for every component and to change a type and position of a jig according to a vehicle type. That is, it is cumbersome to prepare and re-arrange new equipment according to change in a type of vehicle to be produced. In addition, in spot welding, when one corresponding point of two panels is pressurized, a vehicle body is frequently distorted. In particular, this typical equipment uses a plurality of clamping jigs, concentration welding is hindered.

SUMMARY

The present disclosure has been made to solve the above-mentioned problems occurring in the prior art while advantages achieved by the prior art are maintained intact.

Certain embodiments of the present inventive concept provide a technology for a new manufacturing process of a vehicle body, in which complete units are sequentially stacked using a method different from a typical assembly method for assembling complete units in a main buck by picking up, aligning, and gripping components of the vehicle body, loading and pressurizing the component on a position of the vehicle body, and systemizing welding equipments as one apparatus.

Certain embodiments of the present inventive concept provide one apparatus obtained by systemizing a picking apparatus, an aligning apparatus, a gripping apparatus, a pressurizing apparatus, a position checking apparatus, and a projection melting point apparatus.

According to an exemplary embodiment of the present inventive concept, a multi point projection welding method includes loading a component panel having one or more protrusions formed thereon onto a vehicle body panel such that at least one of the protrusions of the component panel contacts the vehicle body panel. The method further includes applying pressure to the vehicle body panel using a vehicle body pressurizing tip and applying pressure to the component panel using a component pressurizing tip while the component panel and the vehicle body panel contact each other, and supplying current to the vehicle body pressurizing tip and the component pressurizing tip such that the protrusion of the component panel contacts the vehicle body panel while the vehicle body pressurizing tip and the component pressurizing tip apply pressure to the vehicle body panel and the component panel, respectively.

According to another exemplary embodiment of the present inventive concept, a multi point projection welding method includes loading a component panel having one or more protrusions formed thereon onto a vehicle body panel such that at least one of the protrusions of the component panel contacts the vehicle body panel. The method may also include applying pressure to one side of the component panel using a vehicle body pressurizing tip and applying pressure to the other side of the component panel using a component pressurizing tip while the component panel and the vehicle body panel contact each other, and supplying current to the vehicle body pressurizing tip and the component pressurizing tip such that the protrusion of the component panel contacts the vehicle body panel while the vehicle body pressurizing tip and the component pressurizing tip apply pressure to the component panel.

In certain embodiments, at least one of the protrusions may have a height of 0.1 mm or more.

In certain embodiments, the current may have a magnitude of 3 to 35 kA and weld time may be 0.01 seconds to 2 seconds.

According to another exemplary embodiment of the present inventive concept, a component loading-welding system for welding a component panel to a vehicle body panel includes a rotation portion body having first and second opposing sides, the first opposing side being coupled to a robot arm. A picking device is installed in the rotation portion body and configured to hold and release the component panel. A vehicle body pressurizing tip is installed in the rotation portion body, and a pressurizing portion body is rotatably installed at the second opposing side of the rotation portion body, A pin clamp is installed in the pressurizing portion body and is configured to clamp the component panel. A component pressurizing tip is installed in the pressurizing portion body and configured to apply pressure to the component panel.

In certain embodiments, the picking device may be an electromagnet or a vacuum suction device.

In certain embodiments, the vehicle body pressurizing tip may configured to move forward and backward in a rotational axis direction of the rotation portion body so as to apply pressure to or release pressure from a vehicle body by a vehicle body pressurizing moving portion.

In certain embodiments, the vehicle body pressurizing tip may be moved in a radial direction of a rotational axis of the rotation portion body by a radius moving portion so as to be close to or away from the rotational axis of the rotation portion body.

In certain embodiments, a current generating apparatus may be installed in the rotation portion body. A conductive ring may be installed in the pressurizing portion body, exposed to the rotation portion body, and electrically connected to the component pressurizing tip.

In certain embodiments, the vehicle body pressurizing tip may be electrically connected to the conductive ring, and the current generating apparatus may be selectively electrically connected to the conductive ring by an indirect current carrying portion.

In certain embodiments, the indirect current carrying portion may be moved toward and away from the conductive ring by an indirect current moving portion so as to contact the conductive ring or separate from the conductive ring.

In certain embodiments, the pin clamp may include two pins.

In certain embodiments, a pressurizing plate with a shape corresponding to the component panel and configured to apply pressure to the component panel may be detachably installed in the pressurizing portion body.

In certain embodiments, the pressurizing plate may be detachably installed in a pressurizing plate coupling portion of the pressurizing portion body, and the pressurizing plate coupling portion may be connected to the pressurizing portion body using a welding force absorbing portion.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION

Exemplary embodiments will now be described more fully with reference to the accompanying drawings.

Figure 1:
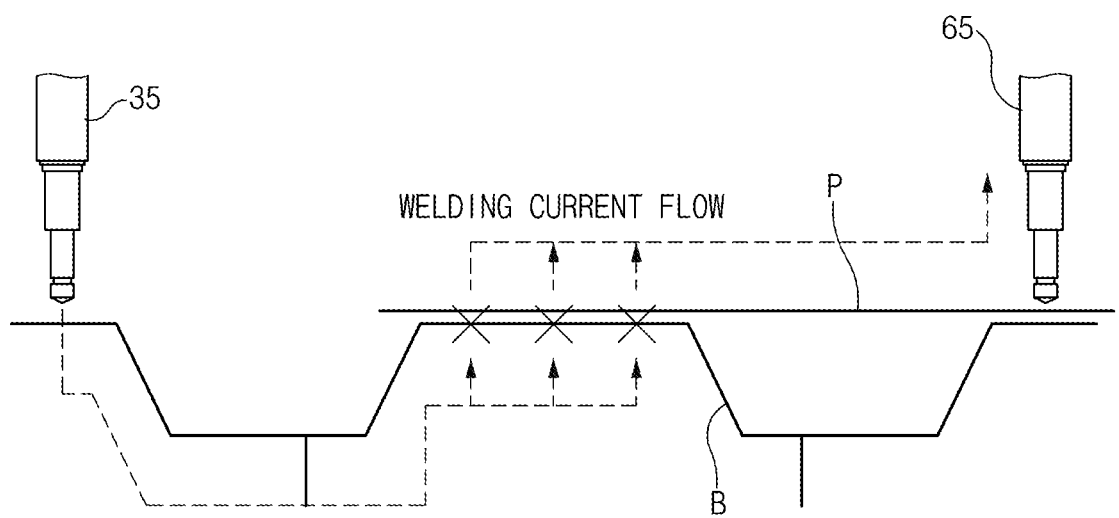
FIG. 1 is a schematic diagram illustrating a projection key welding method.
Figure 2:
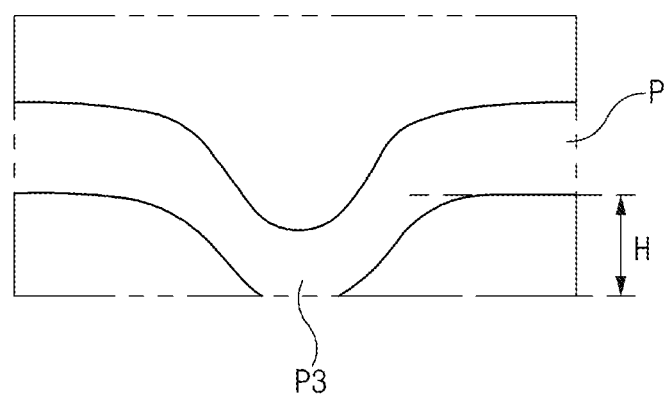
FIG. 2 is an image showing a shape of a sectional view of a protrusion at which projection key welding is performed.
Figure 3:
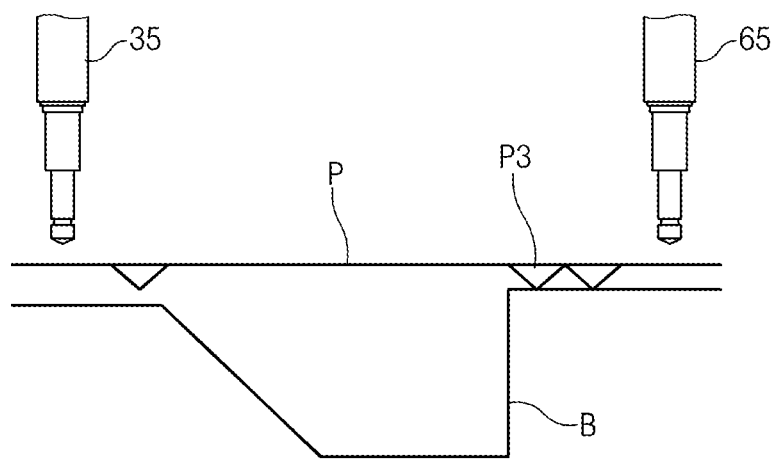
FIG. 3 is a diagram illustrating projection key welding according to an embodiment of the present inventive concept.
Figure 4:
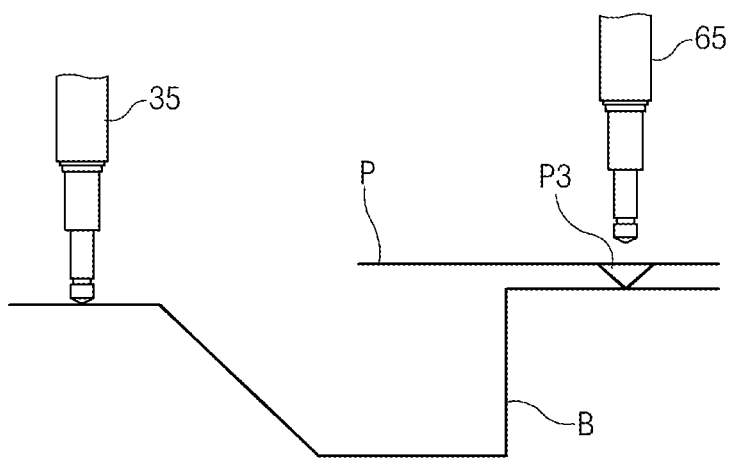
FIG. 4 is a diagram illustrating projection key welding according to another embodiment of the present inventive concept.

FIG. 1 is a schematic diagram illustrating a projection key welding method. FIG. 2 is an image showing a shape of a sectional view of a protrusion at which projection key welding is performed. FIG. 3 is a diagram illustrating projection key welding according to an embodiment of the present inventive concept. FIG. 4 is a diagram illustrating projection key welding according to another embodiment of the present inventive concept.

First, a multi point projection welding method according to an embodiment of the present inventive concept will now be described.

The present disclosure proposes a multi point projection welding method different from typical spot welding. As shown in FIGS. 1 and 4, in the multi point projection welding method, while a component panel P with one or more protrusions P3 formed thereon is pressurized onto a vehicle body panel B such that a protrusion P3 of the component panel P contacts the vehicle body panel B, a vehicle body pressurizing tip 35 is pressurized onto the vehicle body panel B and a component pressurizing tip 65 is pressurized onto the component panel P, and while the vehicle body pressurizing tip 35 and the component pressurizing tip 65 are pressurized onto the vehicle body panel B and the component panel P, respectively, current is supplied to the vehicle body pressurizing tip 35 and the component pressurizing tip 65 such that the protrusion P3 of the component panel P is welded to the vehicle body panel B.

As shown in FIG. 1, according to this process, the protrusion P3 and a portion of the vehicle body panel B, which contacts the protrusion P3, may be melted and welded onto each other by allowing current for welding to flow between the component pressurizing tip 65 and the vehicle body pressurizing tip 35 so as to be concentrated on the protrusion P3 of the component panel P.

The projection welding is mainly featured in that a position of a pressurizing tip at which current flows and a welding position are changed. This means that a plurality of protrusions may be simultaneously welded by appropriately adjusting weld time and current magnitude according to the shape and number of protrusion.

That is, during projection welding, while the component panel is pressurized onto the vehicle body panel (in this state, the protrusion of the component panel strongly contacts the vehicle body panel), when pressurizing tips contact a vehicle body and a component at different positions from the position of the protrusion and current flows, welding is performed at a plurality of positions, and thus the number of processes for welding may be reduced and also problems do not occur in terms of distortion or tilt of components due to the pressurizing tips because the pressurizing tip has only to contact the vehicle body and the component as long as current flows.

Since the pressurizing tips have only to approach different positions other when a welding point, it is very advantageous in that problems in terms of interference between the pressurizing tips and a panel or other production equipment may also be prevented for welding panels with a complex shape. In particular, according to typical spot welding, welding points of two panels that contact each other are pressurized onto each other in opposite directions so as to weld the weld points, and thus it is difficult to apply the typical spot welding to a panel such as a closed section and so on. However, according to the a multi point projection welding method, both pressurizing tips may approach the panel in one direction of the panel, and thus there is no limit in applying the multi point projection welding method to a vehicle body structure that is difficult to approach, such as a closed section and so on.

In particular, the problem in terms of strength of welding that proceeds in one direction may be overcome by forming a protrusion on a panel and locally concentrating current.

As shown in FIG. 2, the height H of the protrusion of the panel may be appropriately adjusted according to a welding condition. In certain embodiments, the height H may be at least a minimum of 0.1 mm. In certain embodiments, current may have a magnitude of about 3 to 35 kA according to a type of a used welder. That is, the current magnitude may be changed according to a material and a thickness thereof, and in the case of a MF DC welder, the current magnitude may be adjusted to 20 kA from 3 kA, and in the case of a capacitor welder, the current magnitude may be adjusted up to 35 kA.

In certain embodiments, with regard to weld time, current may flow for 0.01 second to 1 second, and in the case of multi-step welding, current may flow for maximum of 2 seconds and target points may be welded.

According to the present disclosure, two welding portions of multi point projection welding do not have to pressurize the vehicle body panel and the component panel. For example, as shown in FIG. 3, the vehicle body pressurizing tip 35 may be pressurized onto one side of the component panel, and the component pressurizing tip 65 may be pressurized onto the other side of the component panel.

According to this welding method, a plurality of clamps that are used to fix a component to a typical jig may be omitted, and a trajectory along which a robot performs many operations may be simplified in order to prevent interference of jig, which is advantageous for ensuring cycle time.

Figure 5:
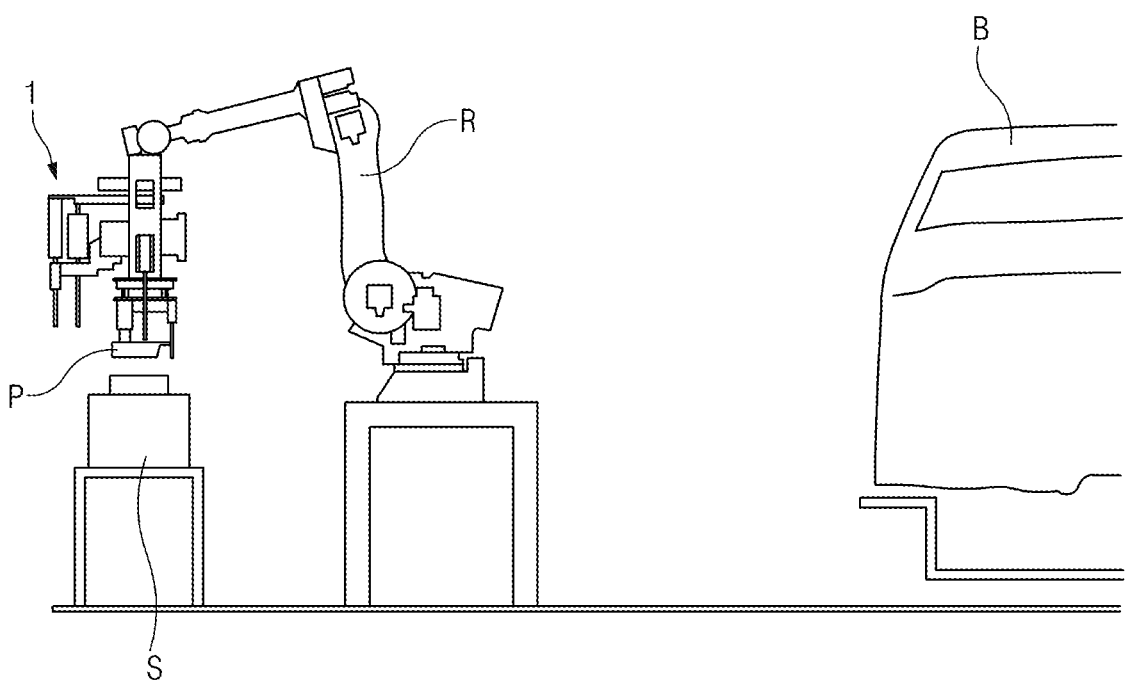
FIG. 5 is a diagram illustrating a state in which a component panel is loaded in a component loading-welding system according to an embodiment of the present inventive concept.
Figure 6:
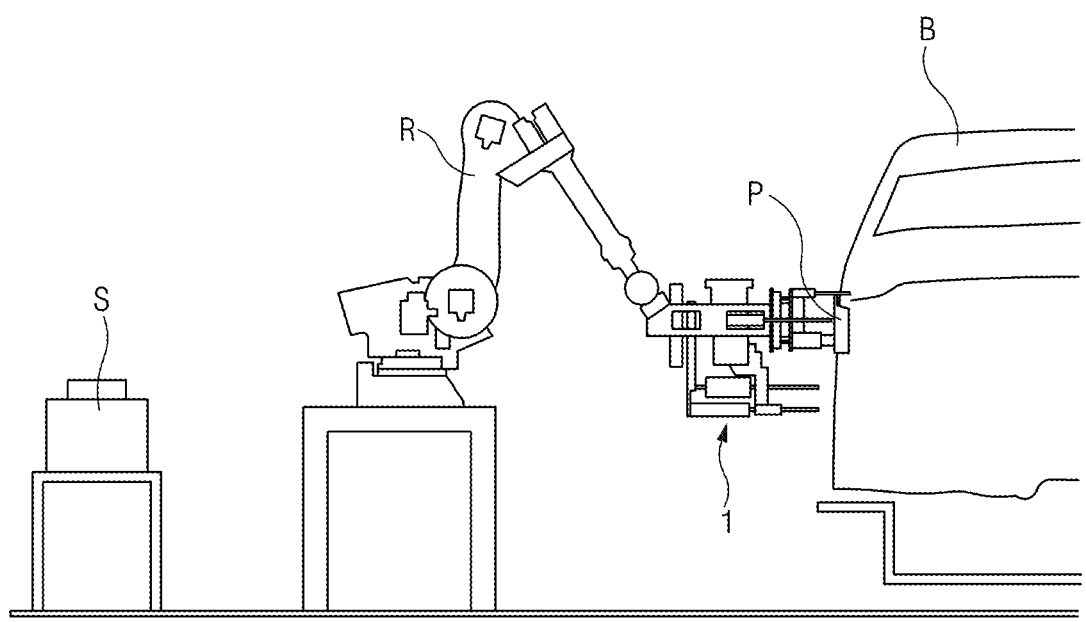
FIG. 6 is a diagram illustrating a state in which a component panel is pressurized onto a vehicle body panel and projection key welding is performed in the component loading-welding system of FIG. 5.
Figure 7:
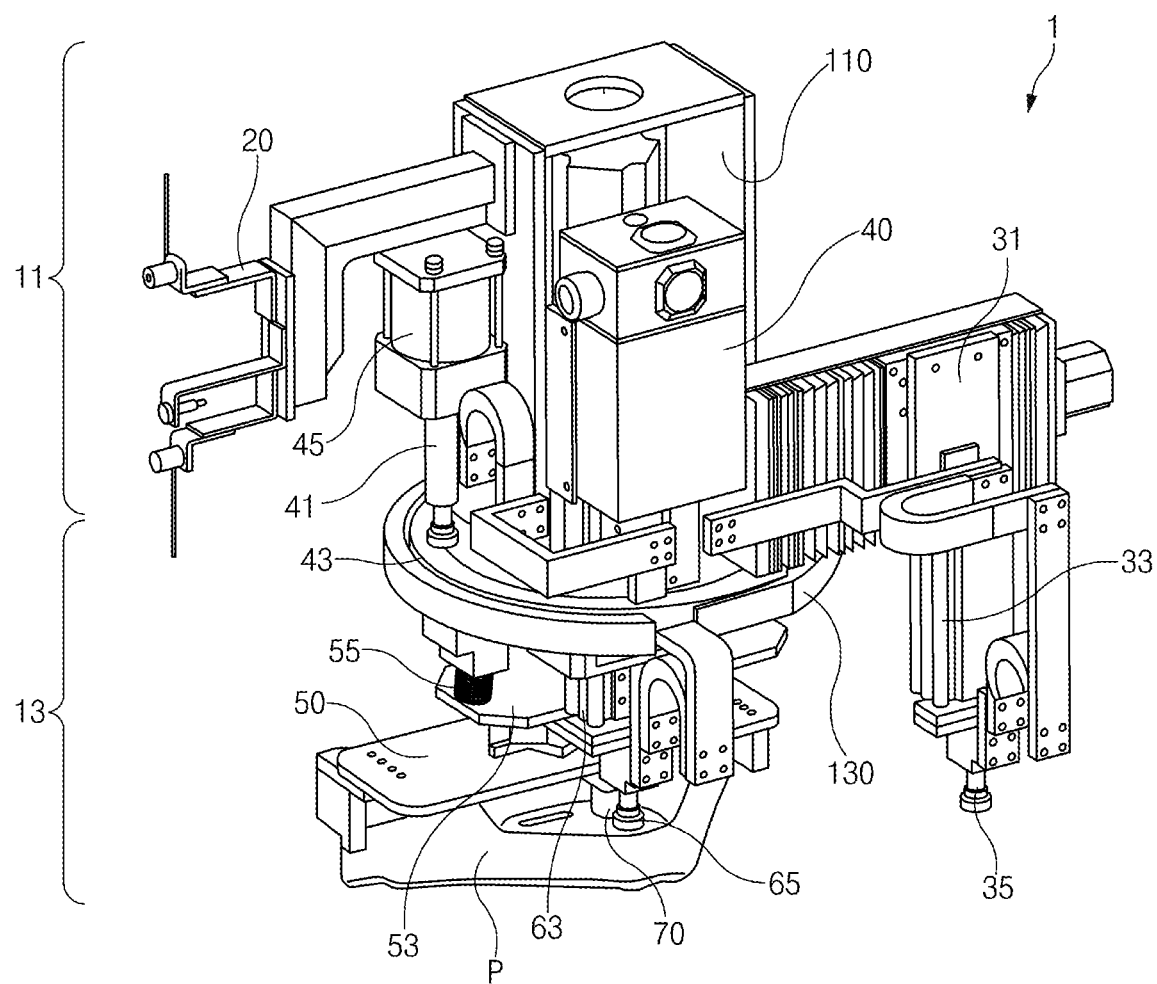
FIG. 7 is a perspective view illustrating a state in which a component panel is clamped to a component loading-welding system according to an embodiment of the present inventive concept.
Figure 8:
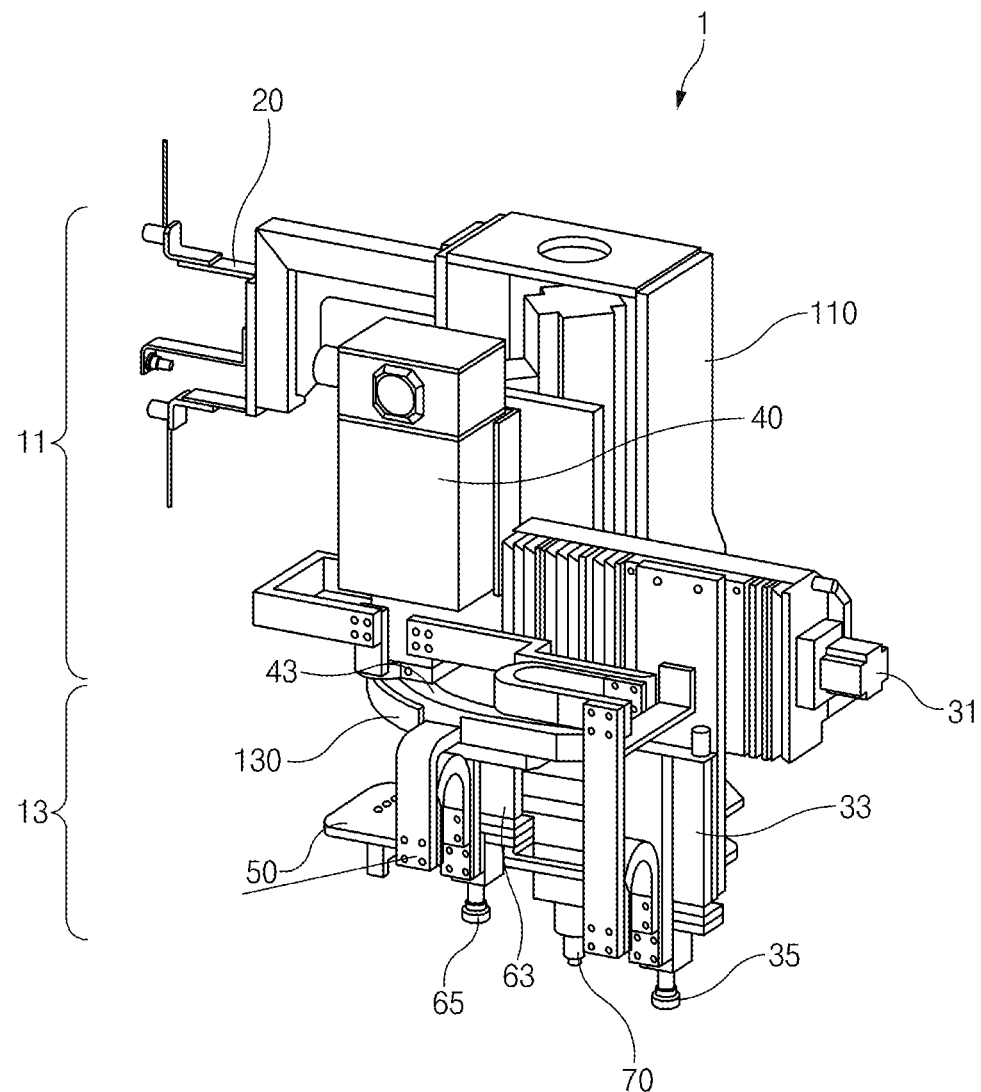
FIG. 8 is a perspective view of a state in which a component panel is not clamped to a component loading-welding system, which is viewed at a different angle, according to an embodiment of the present inventive concept.
Figure 9:
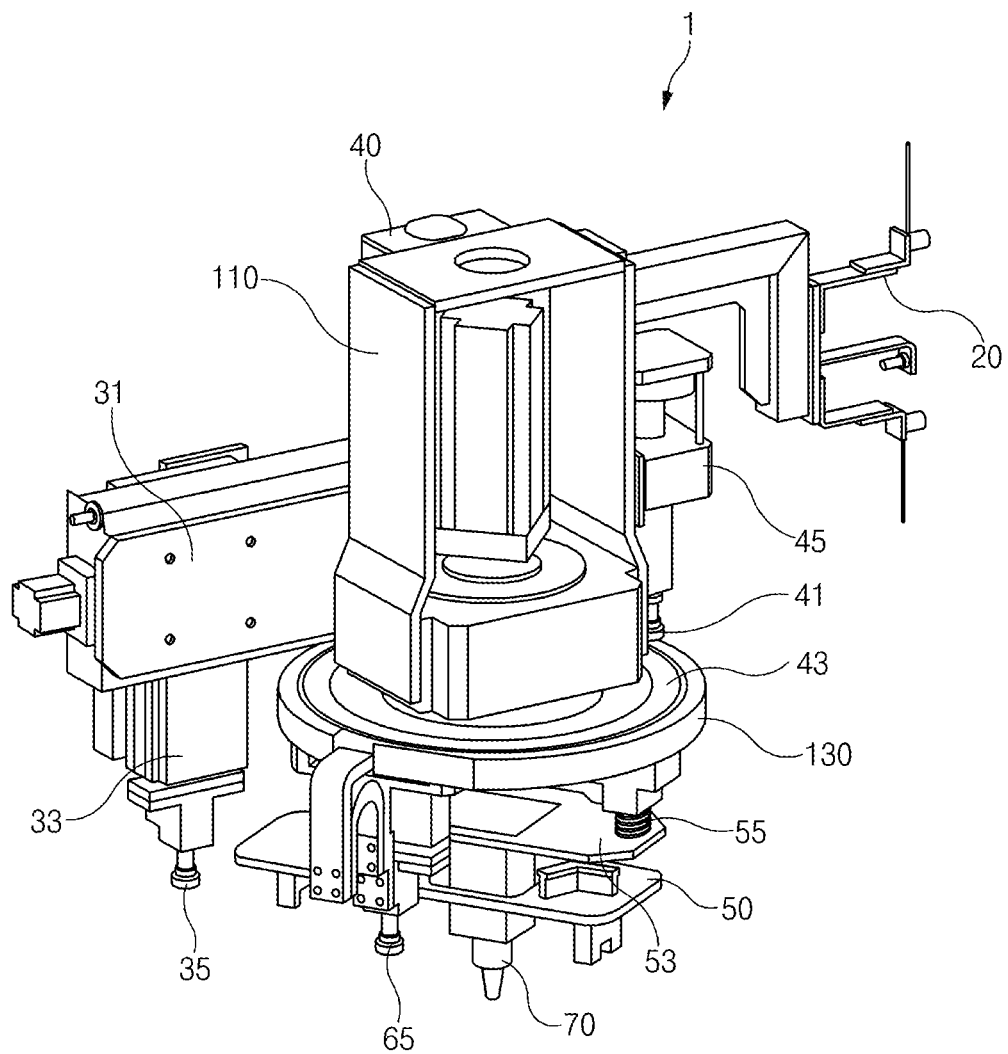
FIG. 9 is a perspective view illustrating a state in which a rotation portion is rotated at a different angle in the component loading-welding system of FIG. 8.
Figure 10:
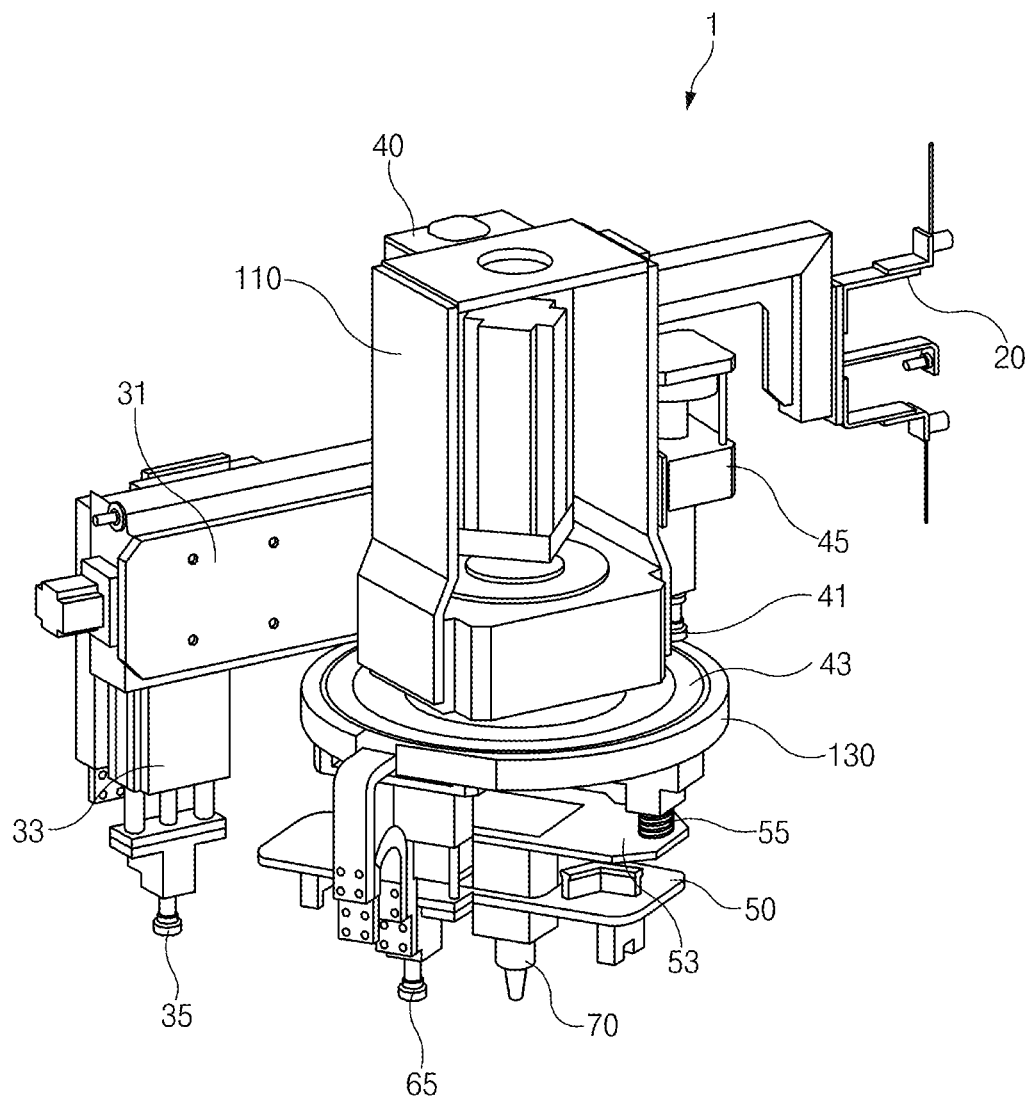
FIG. 10 is a perspective view illustrating a state in which a radius moving portion, a vehicle pressurizing moving portion, and a component pressurizing moving portion are moved at a rotation portion position of FIG. 9 such that a vehicle body pressurizing tip and a component pressurizing tip are pressurized onto a vehicle body (not shown) and a component (not shown) at a pressurizing position of projection key welding.

FIG. 5 is a diagram illustrating a state in which a component panel is loaded in a component loading-welding system according to an embodiment of the present inventive concept. FIG. 6 is a diagram illustrating a state in which a component panel is pressurized onto a vehicle body panel and projection key welding is performed in the component loading-welding system of FIG. 5. FIG. 7 is a perspective view illustrating a state in which a component panel is clamped to a component loading-welding system according to an embodiment of the present inventive concept. FIG. 8 is a perspective view of a state in which a component panel is not clamped to a component loading-welding system, which is viewed at a different angle, according to an embodiment of the present inventive concept. FIG. 9 is a perspective view illustrating a state in which a rotation portion is rotated at a different angle in the component loading-welding system of FIG. 8. FIG. 10 is a perspective view illustrating a state in which a radius moving portion, a vehicle body pressurizing moving portion, and a component pressurizing moving portion are moved at a rotation portion position of FIG. 9 such that a vehicle body pressurizing tip and a component pressurizing tip are pressurized onto a vehicle body (not shown) and a component (not shown) at a pressurizing position of projection key welding.

Hereinafter, a component loading-welding system 1 using the aforementioned multi point projection welding method will be described. According to an embodiment of the multi point projection welding method, even if both two pressurizing tips approach one side of a panel, no problem arises, and thus the pressurizing tips 35 and 65 for welding may be integrated with a component panel pressurizing apparatus and one apparatus.

First, the component loading-welding system 1 according to an embodiment of the present inventive concept may be fixed to an end of a robot arm R, a position of the component loading-welding system 1 may be adjusted by the robot arm R, and a rotation portion 11 and a pressurizing portion 13 may be relatively rotated. This is an integration system, and thus as shown in FIG. 5, the component panel P may be clamped by the system 1 from a component supplying box S, and as shown in FIG. 6, the robot arm R and the system 1 align and apply pressure to the component panel P at a home position of the vehicle body panel B and simultaneously the vehicle body pressurizing tip 35 and the component pressurizing tip 65 are pressurized to the vehicle body panel and the component panel and current flows so as to weld the vehicle body panel and the component panel via welding in the system 1. That is, it is possible to clamp a component panel by one system 1 and to weld the component panel to the vehicle body panel.

A structure of the system 1 will be described in detail. As shown in FIG. 7, the system 1 includes the rotation portion 11 with one end coupled to the robot arm R and the pressurizing portion 13 coupled to the other end of the rotation portion 11.

The robot arm R may be coupled to the rotation portion 11 and may relatively rotate the rotation portion 11 and the pressurizing portion 13. The rotation portion 11 includes a rotation portion body 110 that constitutes a frame thereof and the pressurizing portion 13 may also include a pressurizing portion body 130 that constitutes a frame thereof. The robot arm R is coupled to the rotation portion body 110. The rotation portion body 110 and the pressurizing portion body 130 are rotatably coupled around a rotational axis.

The pressurizing portion body 130 is disposed at an opposite position to the robot arm R based on the rotation portion body 110, and thus the pressurizing portion 13 may load the component panel P onto the vehicle body panel B toward an axial direction of a rotation axis of relation rotation of the rotation portion 11 and the pressurizing portion 13.

The rotation portion body 110 includes a picking device 20 for holding and releasing of the component panel P. The picking device 20 is installed on and is integrally operated with the rotation portion body 110. In certain embodiments, the picking device 20 may be an electromagnet or a vacuum suction device. In certain embodiments, the picking device 20 may be used to pick up one component from components that are stacked on each other, and may temporarily pick up the component panel from a component stack and re-put it on a temporary storage place of the component. That is, in certain embodiments, when a robot arm is moved to reach an upper portion of stacked components while a vacuum is formed in a vacuum suction device, for example, a vacuum cup of an end of the picking device 20, the component panel is held by the picking device 20 due to vacuum. In this embodiment, while the robot arm is moved and the component panel is held by the picking device 20, when the component panel is put on the temporary storage place and vacuum suction of the picking device 20 is released, one component panel may be put on the temporary storage place. As such, the component panel moved to the temporary storage place is fixed to the pressurizing portion 13 by a pin clamp 70.

The component panel P is moved to a home position of the vehicle body panel and is pressurized by a pressurizing plate 50 of the pressurizing portion 13, and the picking device is a device that is temporarily used to pick up one component panel from a plurality of component panels.

In certain embodiments, the pin clamp 70 includes at least two pins. Thus, the robot arm may be moved to allow the pin clamp 70 to approach a component panel put on a temporary storage place so as to accurately align and clamp the component panel by the pin clamp 70.

As illustrated in FIG. 7, the pressurizing plate 50 is fixed to an inner portion (an upper portion in FIG. 7) of the clamped component panel P. The pressurizing plate 50 has a shape corresponding to the component panel P so as to stably load the component panel to a vehicle body during pressurization of the component panel to the vehicle body. The pressurizing plate 50 may be changed according to a vehicle type or a type of the component panel P. In certain embodiments, the pressurizing plate 50 is detachably installed in a pressurizing plate coupling portion 53 installed in the pressurizing portion body 130 using a welding force absorbing portion 55, which in certain embodiments is a spring, as a medium. Accordingly, in certain embodiments, when the robot arm is pressured toward the vehicle body in a rotation axis of the system, the pressurizing plate 50 installed in the pressurizing plate coupling portion 53 stably pressurizes the component panel to a home position, and thus a pressurizing force is absorbed into the welding force absorbing portion 55 as a spring, thereby preventing the component panel or the vehicle body panel from being changed due to force of the robot arm.

While the pressurizing plate 50 pressurizes the component panel P onto the vehicle body panel B, embodiments of the aforementioned multi point projection welding method may be used. To this end, the system according to embodiments of the present inventive concept is configured in such a way that the vehicle body pressurizing tip 35 is installed in the rotation portion body 110 and the component pressurizing tip 65 for pressurizing the component panel P is installed in the pressurizing portion body 130.

Since the component pressurizing tip 65 is installed in the pressurizing portion 13, the component pressurizing tip 65 installed in the pressurizing portion 13 is also fixed to the pin clamp 70, and pressure to the component panel P pressurized by the pressurizing plate 50 may be easily applied or released. In certain embodiments, the component pressurizing tip 65 is also moved forward and backward by a component pressurizing moving portion 63 installed in the pressurizing portion 13.

The vehicle body pressurizing tip 35 is moved to a portion of a vehicle body, to be pressurized, and then is pressurized. To this end, in certain embodiments, a position of the vehicle body pressurizing tip 35 is adjusted by relatively rotating the rotation portion body 110 with respect to the pressurizing portion body 130 to adjust a directional angle and then moving the rotation portion body 110 in a radial direction of a rotational axis of a rotation portion by a radius moving portion 31 so as to be close to or away from the rotational axis of the rotation portion. As such, in certain embodiments, according to rotation of the rotation portion and an operation of the radius moving portion, the vehicle body pressurizing tip that is accurately aligned is moved forward and backward in the same direction as a rotational axis direction of the rotation portion by a vehicle body pressurizing moving portion 33 so as to apply pressure to or release pressure from the vehicle body. A position of the vehicle body to be pressurized by the vehicle body pressurizing tip may be changed according to a vehicle type, and a type and position of a component panel to which the vehicle body panel is welded. As such, the vehicle body pressurizing tip may be aligned and an operation is performed according to rotation of the rotation portion and radius-adjustment of the radius moving portion 31, and thus a typical technology of newly aligning jigs for every component and every vehicle type may be flexibly and widely used without cumbersome.

The system 1 according to embodiments of the present inventive concept is configured to achieve the following weld structure of the vehicle body pressurizing tip 35 and the component pressurizing tip 65 so as to freely rotate the rotation portion and the pressurizing portion.

In certain embodiments, a current generating apparatus 40 is installed in the rotation portion body 110, a conductive ring 43 exposed to a rotation portion body is installed in the pressurizing portion body 130, and the conductive ring 43 is electrically connected to the component pressurizing tip 65. Both the conductive ring 43 and the component pressurizing tip are included in the pressurizing portion body 130, and thus the conductive ring 43 and the component pressurizing tip may be electrically connected irrespective of rotation of the rotation portion 11.

In certain embodiments, the vehicle body pressurizing tip 35 may also be electrically connected to the conductive ring 43. In certain embodiments, the vehicle body pressurizing tip 35 may be relatively rotated with respect to the conductive ring 43, and thus vehicle body pressurizing tip 35 and the conductive ring 43 may be connected using an elastic terminal and so on so as to be electrically connected to each other while being relatively moved with respect to each other. On the other hand, in certain embodiments, since the vehicle body pressurizing tip 35 is integrally rotated with the current generating apparatus 40, the vehicle body pressurizing tip 35 may be electrically connected directly to the current generating apparatus 40.

In certain embodiments, the current generating apparatus 40 may be selectively and electrically connected to the conductive ring 43 by an indirect current carrying portion 41. The indirect current carrying portion 41 may be moved forward and backward the conductive ring 43 by an indirect current moving portion 45 so as to contact the conductive ring 43 or contact-release from the conductive ring 43, and thus the indirect current carrying portion 41 may be electrically connected to or disconnected from the conductive ring 43.

Accordingly, in certain embodiments, when the vehicle body pressurizing tip 35 is positioned at a home position according to rotation of the rotation portion and movement of a position of the radius moving portion, all of the indirect current moving portion 45, the vehicle body pressurizing moving portion 33, and the component pressurizing moving portion 63 may advance the indirect current carrying portion 41, the vehicle body pressurizing tip 35, and the component pressurizing tip 65 so as to contact the conductive ring 43, the vehicle body panel, and the component panel, respectively and to allow current to flow, and thus welding may be performed.

After welding, while the indirect current carrying portion, the vehicle body pressurizing tip, and the component pressurizing tip may be moved backward and clamping of a pin clamp is released, the robot arm moves the system 1 away from the vehicle body, thereby completing an operation.

The system according to the embodiments of the present inventive concept may simultaneously perform clamping, alignment, and welding of component using only one system.

In addition, in certain embodiments, a production process may be more efficiently performed by further adding a vision apparatus, a home position ensuring apparatus, and a welding apparatus to a production line.

According to embodiments of the present inventive concept, the number of equipments and processes may be minimized and a new type of assembly technology of a vehicle body may be ensured. That is, all sub lines for completion may be integrated into a main line, thereby simplifying an entire process.

In addition, in certain embodiments, a plurality of points (dimple forming portions) positioned at a different position from a pressurizing portion may be simultaneously welded via one welding operation.

When a component is supplied to a box, component movement and projection key welding may be performed by one system, thereby simplifying a production line and ensuring a space.

In certain embodiments, unit components may be sequentially stacked and welded to form an entire structure.

Unit components may be sequentially welded, thereby minimizing a welding portion for a closed section.

In certain embodiments, a current position of a component to be attached may be recognized and corrected and moved to a home position, and thus errors may be continuously corrected even if the same operation is repeated several hundred times.

In certain embodiments, a vehicle body may be prevented from being distorted during spot welding through projection key welding.

In addition, use of clamp may be minimized during projection key welding, and thus concentration welding is possible.

While embodiments of the present inventive concept has been particularly shown and described with reference to exemplary drawings thereof, it will be understood by those of ordinary skill in the art that various changes in form and details may be made therein without departing from the spirit of the present inventive concept as defined by the following claims.

What is claimed is:

1. A multi point projection welding method comprising:
   loading a component panel having one or more protrusions formed thereon onto a vehicle body panel, such that the one or more protrusions of the component panel contacts the vehicle body panel at one or more welding positions;
   applying pressure to a first side of the component panel at a first contact position using a vehicle body pressurizing tip, and applying pressure to a second side of the component panel at a second contact position using a component pressurizing tip while the component panel and the vehicle body panel contact each other; and
   supplying current to the vehicle body pressurizing tip and the component pressurizing tip, such that the one or more protrusions of the component panel and a portion of the vehicle body panel that contacting the one or more protrusions are welded onto each other while the vehicle body pressurizing tip and the component pressurizing tip apply pressure to the component panel,
   wherein the first contact position between the first side of the component panel and the vehicle body pressurizing tip is different from each contact position of the one or more protrusions contacting the vehicle body panel, the vehicle body pressurizing tip is not aligned with any of the one or more protrusions;
   wherein the second contact position between the second side of the component panel and the component pressurizing tip is different from each contact position of the one or more protrusions contacting the vehicle body panel, the component pressurizing tip is not aligned with any of the one or more protrusions; and
   wherein the one or more welding positions are located between the first contact position and the second contact position.

2. The multi point projection welding method according to claim 1, wherein at least one of the protrusions has a height of 0.1 mm or more.

3. The multi point projection welding method according to claim 1, wherein the current has a magnitude of 3 to 35 kA and weld time is 0.01 seconds to 2 seconds.

* * * * *